April 9, 1957　　　J. D. RUMSEY　　　2,787,996
COLLAPSIBLE PORTABLE GRILL
Filed April 16, 1954　　　　　　　　　　　2 Sheets-Sheet 1
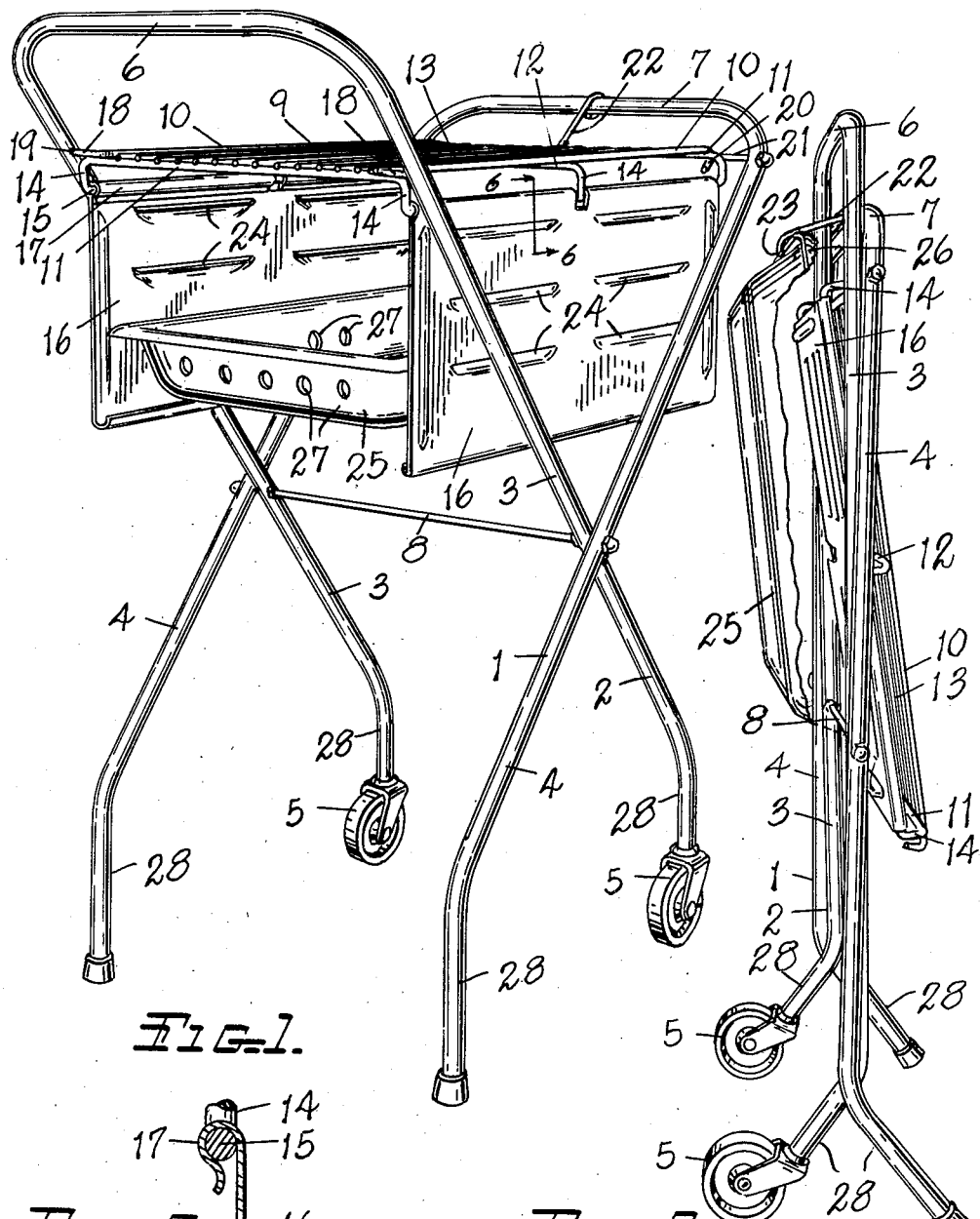
INVENTOR.
Jon D. Rumsey April 9, 1957
J. D. RUMSEY
2,787,996
COLLAPSIBLE PORTABLE GRILL
Filed April 16, 1954
2 Sheets-Sheet 2
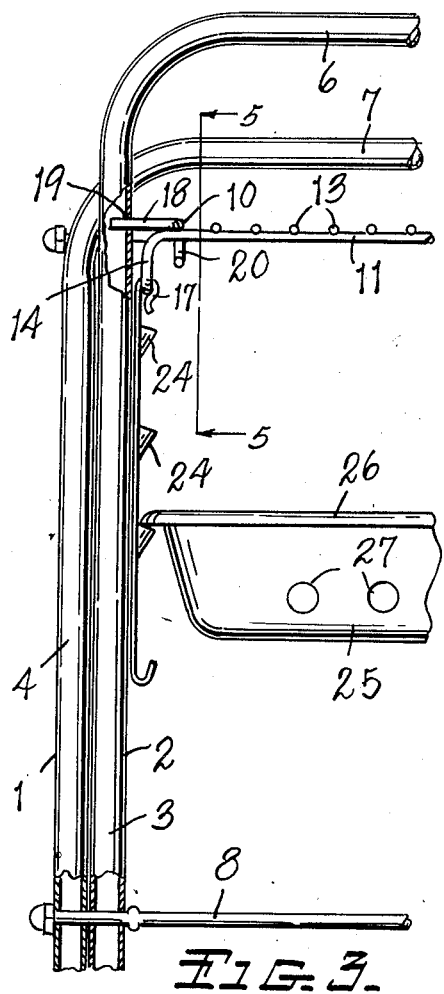
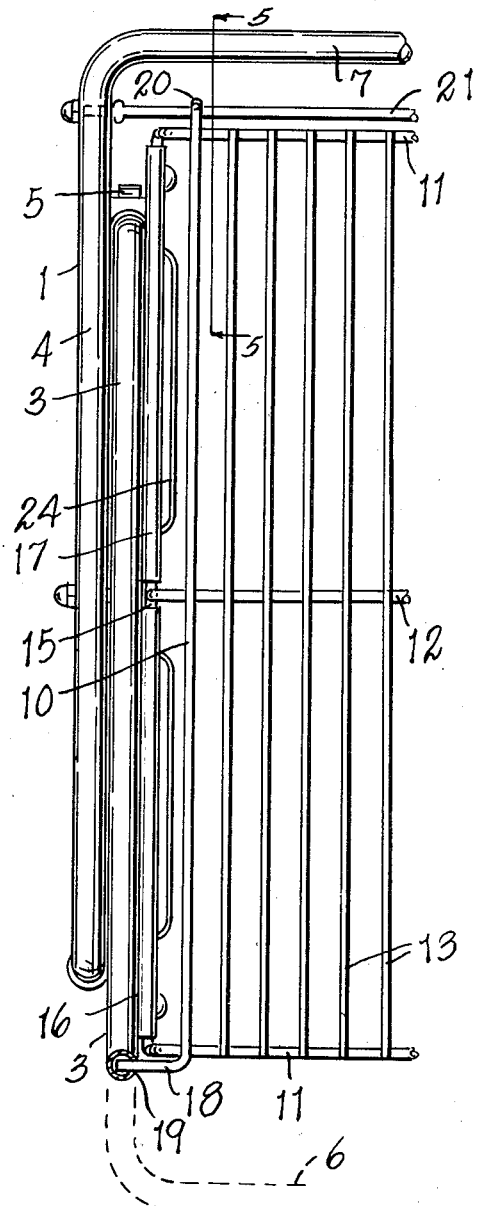
INVENTOR.
Jon D. Rumsey
BY
Otura Earl
Attorney.

United States Patent Office 2,787,996
Patented Apr. 9, 1957

2,787,996
COLLAPSIBLE PORTABLE GRILL

Jon D. Rumsey, Albion, Mich., assignor to Union Steel Products Company, Albion, Mich.

Application April 16, 1954, Serial No. 423,565

14 Claims. (Cl. 126—25)

This invention relates to a collapsible portable grill.
The main objects of this invention are:
First, to provide a collapsible portable grill which may be very compactly collapsed for shipment or storage, which is relatively light in weight and at the same time when erected is strong and rigid.

Second, to provide a collapsible portable grill which is formed of relatively few parts and may be very economically produced and one which may be quickly erected and collapsed.

Further objects relating to details and economies of the invention will appear from the description to follow: The invention is defined and pointed out in the claims. A preferred embodiment of the invention is illustrated in the accompanying drawing, in which:

Fig. 1 is a perspective view of a portable grill embodying my invention in erected position.

Fig. 2 is a side elevational view thereof when collapsed.

Fig. 3 is an enlarged fragmentary elevational view looking from the right of Fig. 1.

Fig. 4 is a fragmentary plan view.

Fig. 5 is an enlarged detailed view in section on a line corresponding to line 5—5 of Fig. 4.

Fig. 6 is a fragmentary view in section on a line corresponding to line 6—6 of Fig. 1.

The embodiment of my invention illustrated comprises outer and inner frame members designated generally by the numerals 1 and 2 respectively, these being of inverted U-shape and desirably formed integrally of tubular stock. The side members 3 of the inner frame member 2 are longer than the side members 4 of the outer frame member 1 and are provided with wheels 5 at their lower ends. The cross pieces 6 and 7 of the frame members 1 and 2 constitute handle bars, the cross-piece 6 projecting substantially above the cross-piece 7 and being designed to be used when the grill is moved about on its wheels. The frame members are collapsibly connected by the pivot rod 8 disposed intermediate the ends of the frame members so that when the frame members are in erected position they are in crossed relation. The frame members are supported in this erected position by means of the grill designated generally by the numeral 9 and which comprises longitudinal or side bars 10, end cross-bars 11 and intermediate cross-bar 12. The grid bars 13 are disposed in parallel relation upon the cross-bars and fixedly secured thereto as by welding, welds being indicated at 131 in Fig. 5. The cross-bars 11 and 12 have downturned ends 14 to which the pivot rods 15, on which the side walls 16 are pivotally secured, are mounted.

The upper edges of the side walls are folded to provide knuckles 17 engaging the pivot rods 15.

The longitudinal or side bars 10 of the grid have laterally turned pivots 18 at one end which are pivotally engaged in openings 19 provided therefor in the inner frame member uprights. The side bars of the grid have downturned hooks 20 at their swinging ends which are engaged with the cross-rod 21 on the outer frame member 2 when the grill is erected and in which position the grid constitutes a tie member for the frame members, that is, it limits their outward swing.

The parts are locked in this position by the locking hook 22 which is pivotally or swingably mounted on the cross-piece 7 of the frame member 2 and has a downturned bill 23 at its outer end which is engageable with the adjacent end cross-bar of the grid. With the parts thus engaged the grill may be used and moved about without danger of collapsing.

The outward swing of the grill side walls 16 when in erected position is limited by the uprights of the frame members. The side walls are provided with vertically spaced ledges 24 for the combined fuel and drip pan 25. This pan is provided with an outturned flange-like rim 26 which may be selectively engaged with the ledges 24 to position the fuel pan in proper relation to the grid for the particular food being cooked. The pan 25 has an imperforate bottom and series of air openings 27 in its side walls. The purpose of the imperforate bottom is to provide a fuel pan which likewise constitutes a drip pan, the grill being designed to use on the lawn or otherwise where dripping of grease or ash might be objectionable.

With the parts thus arranged with the pan removed, the locking hook disengaged, the grid disengaged from the rod 21, and the side walls collapsed on the underside of the grid and the frame, the grid may be collapsed with the parts thereof in substantially parallel relation as is shown in Fig. 2.

The side pieces are angled or bent at 28 so that when collapsed the lower portion of the side pieces swing into cross relation and provide a support for the collapsed structure. In this position the pan 25 may be seated upon the pivot rod 8 as is shown by dotted lines in Fig. 2 and the locking hook 22 engaged with the rim at the top of the pan so that all the parts are held in collapsed position for storage or transportation.

The grill may be very quickly and easily erected and when erected the parts are secured against collapsing. The parts are arranged so that they may be formed of relatively light stock and at the same time the erected structure is strong and rigid.

I have illustrated and described my invention in a highly practical embodiment thereof. I have not attempted to illustrate or describe other embodiments or adaptations as it is believed this disclosure will enable those skilled in the art to embody or adapt my invention as may be desired.

I claim:

1. A portable grill comprising inner and outer frame members including side pieces and connecting cross pieces at their upper ends, a pivot rod connecting said frame member side pieces intermediate the ends thereof, the side pieces of the inner frame member being longer than those of the outer frame member, a grid comprising side bars and end and intermediate cross bars fixedly secured to said side bars and grid bars fixedly secured to said cross bars, said grid cross bars having downturned ends, side wall pivot rods secured to the said downturned ends of said grid cross bars, said grid side bars having outturned pivots at one end thereof pivotally engaged with the side pieces of the inner frame member and having downturned hooks at their other ends, a cross rod extending between the side pieces of the outer frame member and with which said grid hooks may be detachably engaged, the grid constituting a tie member for the frame members when it is so engaged, a locking hook swingably mounted on the cross piece of the outer frame member and detachably engageable with the swinging end of the grid when the parts are in erected position, side walls pivotally mounted on said side wall pivots on said grid to depend therefrom between the frame member side pieces or to be collapsed on the underside of the grid, said side walls being provided with opposed pan ledges, and a fuel pan detachably engageable with said pan ledges of said side walls, the side pieces of the inner frame member acting to limit the outward swing of said side walls when the pan is engaged therewith, said frame members being collapsible on their pivot connection into substantially parallel relation and said grid with the side walls collapsed thereon being collapsible on its pivot connection to the inner frame member into a generally longitudinally disposed relation to the collapsed frame members in which position one end of said pan may be supportingly engaged on the frame member pivot rod and said locking hook engaged with the other end of the pan.

2. A portable grill comprising inner and outer frame members including side pieces and connecting cross pieces at their upper ends, a pivot rod connecting said frame member side pieces intermediate the ends thereof, the side pieces of the inner frame member being longer than those of the outer frame member, a grid comprising side bars and end and intermediate cross bars fixedly secured to said side bars and grid bars fixedly secured to said cross bars, said grid cross bars having downturned ends, side wall pivot rods secured to the said downturned ends of said grid cross bars, said grid side bars having outturned pivots at one end thereof pivotally engaged with the side pieces of the inner frame member and having downturned hooks at their other ends, a cross rod extending between the uprights of the outer frame member and with which said grid hooks may be detachably engaged, side walls pivotally mounted on said side wall pivots on said grid to depend therefrom between the frame member side pieces or to be collapsed on the under side of the grid, said side walls being provided with opposed pan ledges, and a fuel pan detachably engageable with said pan ledges of said side walls, said frame members being collapsible on their pivot connection into substantially parallel relation and said grid with the side walls collapsed thereon being collapsible on its pivot connection to the inner frame member into a generally longitudinally disposed relation to said frame members.

3. A portable grill comprising inner and outer frame members including side pieces and connecting cross pieces at their upper ends, a pivot rod connecting said frame member side pieces intermediate the ends thereof, the side pieces of the inner frame member being longer than those of the outer frame member and being provided with wheels at their lower ends, a grid comprising side bars and end and intermediate cross bars fixedly secured to said side bars and grid bars fixedly secured to said cross bars, said grid cross bars having downturned ends, side wall pivot rods secured to the said downturned ends of said grid cross bars, said grid side bars having outturned pivots at one end thereof pivotally engaged with the side pieces of the inner frame member and having downturned hooks at their other ends, a cross rod extending between the side pieces of the outer frame member and with which said grid hooks may be detachably engaged, side walls pivotally mounted on said side wall pivots on said grid to depend therefrom between the frame member side pieces or to be collapsed on the underside of the grid, said side walls being provided with opposed pan ledges, and a fuel pan detachably engageable with said pan ledges of said side walls, said frame members being collapsible on their said pivot connection into substantially parallel relation and said grid with the side walls collapsed thereon being collapsible on its pivots into a generally longitudinally disposed relation to said collapsed frame members, the side pieces having angularly disposed lower end portions which constitute diverging supporting legs for the collapsed structure.

4. A collapsible grill comprising inner and outer frame members including crossed, pivotally connected side pieces, a grid comprising side bars and end and intermediate cross bars fixedly secured to said side bars and grid bars fixedly secured to said cross bars, said grid cross bars having downturned ends, side wall pivot rods secured to said downturned ends of said grid cross bars, said grid side bars having outturned pivots at one end thereof pivotally engaged with the uprights of the inner frame member and having downturned hooks at their other ends, a cross rod extending between the side pieces of the outer frame member and with which said grid hooks may be detachably engaged, the grid constituting a tie member for the frame members when it is so engaged, a locking hook swingably mounted on the cross piece of the outer frame member and detachably engageable with the swinging end of the grid when the parts are in erected position, side walls pivotally mounted on said side wall pivots on said grid to depend therefrom between the frame member side pieces in supported relation thereto to be collapsed on the under side of the grid, said side walls being provided with pan ledges, and a fuel pan engageable with said pan ledges of said side walls, said frame members being collapsible on their said pivot connection into substantially parallel relation and said grid with the side walls thereof collapsed being collapsible into a generally longitudinally disposed relation to said frame members in which position one end of said pan may be supportingly engaged on said frame member pivot rod and said locking hook engaged with the other end of the pan, the side pieces having angularly disposed lower end portions which constitute diverging supporting legs for the collapsed structure.

5. A collapsible grill comprising inner and outer frame members including crossed pivotally connected side pieces, a grid comprising side bars and end and intermediate cross bars fixedly secured to said side bars and grid bars fixedly secured to said cross bars, said grid cross bars having downturned ends, side wall pivot rods secured to the said downturned ends of said grid cross bars, said grid side bars having outturned pivots at one end thereof pivotally engaged with the side pieces of the inner frame member and having downturned hooks at their other ends, a cross rod extending between the side pieces of the outer frame member and with which said grid hooks may be detachably engaged, the grid constituting a tie member for the frame members when it is so engaged, side walls pivotally mounted on said side wall pivots on said grid to depend therefrom between the frame member side pieces or to be collapsed on the under side of the grid, said side walls being provided with pan ledges, and a fuel pan engageable with said pan ledges of said side walls, the side pieces of the inner frame member acting to limit the outward swing of said side walls when the pan is engaged therewith, said frame members being collapsible on their pivot connection into substantially parallel relation and said grid with the side walls collapsed thereon being collapsible on its pivot connection to the inner frame member into a generally longtiudinally disposed relation to the collapsed frame members in which position one end of said pan may be supportingly engaged on the frame member pivot rod and said locking hook engaged with the other end of the pan, the side pieces having angularly disposed lower end portions which constitute diverging supporting legs for the collapsed structure.

6. A portable grill comprising inner and outer frame members including side pieces having connecting cross pieces at their upper ends, a pivot rod connecting said frame member side pieces intermediate the ends thereof, the side pieces of the inner frame member being longer than those of the outer frame member and being provided with wheels at their lower ends, a grid swingably mounted on one frame member and detachably engageable with the other frame member, side walls pivotally mounted on said grid to depend therefrom between the frame member side pieces, said side walls being provided with pan ledges and a pan removably engageable with said pan ledges of said side walls, said frame members being collapsible on their said pivot connection to each other and said grid with the side walls thereof collapsed being collapsible into a generally longitudinally disposed relation to the collapsed frame members, the side pieces having angularly disposed lower end portions which constitute diverging supporting legs for the collapsed structure.

7. A portable grill comprising inner and outer frame members including side pieces having connecting cross pieces at their upper ends, a pivot rod connecting said frame member side pieces intermediate the ends thereof, a grid swingably mounted on one frame member and detachably engageable with the other frame member, side walls pivotally mounted on said grid to depend therefrom between the frame member side pieces, said side walls being provided with pan ledges, and a pan provided removably engageable with said pan ledges of said side walls, said frame members being collapsible on their said pivot connection into substantially parallel relation and said grid with the side walls thereof collapsed being collapsible into a generally longitudinally disposed relation to the collapsed frame members.

8. A portable grill comprising inner and outer frame members including side pieces having connecting cross pieces at their upper ends, a pivot rod connecting said frame member side pieces intermediate the ends thereof, a grid swingably mounted on one frame member and detachably engageable with the other frame member, the grid constituting a tie member for the frame members when it is so engaged, a locking hook mounted on the second frame member and detachably engageable with the swinging end of the grid when the parts are in erected position, side walls collapsibly mounted on said grid to depend therefrom between the frame member side pieces, said side walls being provided with pan ledges, and a pan removably engageable with said pan ledges of said side walls, said frame members being collapsible on their said pivot connection into substantially parallel relation and said grid with the side walls thereof collapsed being collapsible into a generally longitudinally disposed relation to the collapsed frame members.

9. A portable grill comprising collapsibly connected frame members, a grid swingably mounted on one frame member and detachably engageable with the other member, the grid constituting a tie member for the frame members when it is so engaged, a locking hook mounted on the other frame member and detachably engageable with the swinging end of the grid when the parts are in erected position, side walls collapsibly mounted on said grid to depend therefrom between the frame members when erected, said side walls being provided with pan ledges, and a pan provided with a flange-like rim engageable with said pan ledges of said side walls, said pan having an imperforate bottom and air inlets in its side walls, said frame members being collapsible into substantially parallel relation and said grid with the side walls thereof collapsed being collapsible into a generally longitudinally disposed relation to the collapsed frame members.

10. A portable grill comprising collapsibly connected frame members, a grid swingably mounted on one frame member and detachably engageable with the other frame member, side walls collapsibly mounted on said grid to depend therefrom between the frame members, said side walls being provided with pan ledges, and a pan provided with a flange-like rim selectively engageable with said pan ledges of said side walls, said pan having an imperforate bottom and air inlets in its side walls, said frame members being collapsible into substantially parallel relation and said grid with the side walls thereof collapsed being collapsible into a generally longitudinally disposed relation to the collapsed frame members.

11. A portable grill comprising collapsibly connected frame members, a grid swingably mounted on one frame member and detachably engageable with the other member, the grid constituting a tie member for the frame members when it is so engaged, a locking hook mounted on the second frame member and detachably engageable with the swinging end of the grid when the parts are in erected position, side walls collapsibly mounted on said grid to depend therefrom between the frame members, said side walls being provided with pan ledges, and a pan engageable with said pan ledges of said side walls, said frame members being collapsible into substantially parallel relation and said grid with the side walls thereof collapsed being collapsible into a generally longitudinally disposed relation to collapsed frame members.

12. A portable grill comprising collapsibly connected frame members, a grid swingably mounted on one frame member and detachably engageable with the other frame member, the grid constituting a tie member for the frame members when it is so engaged, a locking hook mounted on the second frame member and detachably engageable with the swinging end of the grid when the parts are in erected position, side walls collapsibly mounted on said grid to depend therefrom between the frame members, said side walls being provided with pan ledges, and a pan engageable with said pan ledges of said side walls, said frame members being collapsible into substantially parallel relation and said grid with the side walls collapsed being collapsible into a generally longitudinally disposed relation to said collapsed frame members.

13. A portable grill comprising inner and outer frame members including side pieces connected in spaced relation, connecting pivots for corresponding frame member side pieces disposed intermediate the ends thereof, a grid pivotally connected at one end to the side pieces of the inner frame member and detachably engageable with the outer frame member and constituting a tie member for the frame members when they are in erected position, side walls collapsibly mounted on said grid to depend therefrom between the frame member side pieces when the parts are in erected position, said side walls being provided with pan ledges, and a pan removably engageable with said pan ledges of said side walls, said frame members and grid being collapsible into substantially parallel relation when the grid is disengaged from the outer frame member.

14. A collapsible grill comprising frame members including side pieces connected in spaced relation, corresponding side pieces of the frame members being pivotally connected intermediate the ends thereof permitting their being adjusted to erected crossed position or the collapsing of the frame members into approximately parallel relation, a grid member pivotally connected at one end to the side pieces of one frame member above the pivotal connections for the frame members and detachably engageable with the other frame member above the said pivotal connection and constituting a tie member for the frame members when they are in erected position, side walls collapsibly mounted on said grid to depend therefrom between the side pieces of the frame members when the parts are in erected position with the side pieces of at least one frame member constituting means for limiting the outward swing of the erected side walls, and a pan removably engageable with said side walls when they are in erected position, the pan acting to prevent inward collapsing of the side walls when it is in engagement therewith.

References Cited in the file of this patent

UNITED STATES PATENTS

| | | |
|---|---|---|
| 1,250,861 | Hackney | Dec. 18, 1917 |
| 2,122,275 | Bitney | June 28, 1938 |
| 2,164,835 | Pearson et al. | July 4, 1939 |
| 2,484,239 | Moon | Oct. 11, 1949 |